US012752786B2

(12) United States Patent
Skillsäter et al.

(10) Patent No.: US 12,752,786 B2
(45) Date of Patent: Oct. 6, 2026

(54) PATH DETERMINATION FOR VEHICLES

(71) Applicant: Volvo Autonomous Solutions AB, Gothenburg (SE)

(72) Inventors: Calle Skillsäter, Torshälla (SE); Johan Sjöberg, Västerås (SE)

(73) Assignee: VOLVO AUTONOMOUS SOLUTIONS AB, Gothenburg (SE)

(*) Notice: Subject to any disclaimer, the term of this patent is extended or adjusted under 35 U.S.C. 154(b) by 189 days.

(21) Appl. No.: 18/543,477

(22) Filed: Dec. 18, 2023

(65) Prior Publication Data

US 2024/0199018 A1 Jun. 20, 2024

(30) Foreign Application Priority Data

Dec. 19, 2022 (EP) .................................... 22214552

(51) Int. Cl.
*B60W 30/165* (2020.01)
*G05D 1/695* (2024.01)
*G05D 109/10* (2024.01)

(52) U.S. Cl.
CPC .......... *B60W 30/165* (2013.01); *G05D 1/695* (2024.01); *B60W 2520/26* (2013.01);
(Continued)

(58) Field of Classification Search
CPC .......... B60W 30/165; B60W 2520/26; B60W 2530/10; B60W 2554/4041; B60W 2554/802; B60W 2300/125; B60W 2552/15; B60W 60/001; B60W 30/18009; B60W 40/00; G05D 1/695;
(Continued)

(56) References Cited

U.S. PATENT DOCUMENTS

| | | | | |
|---|---|---|---|---|
| 12,195,041 | B2 * | 1/2025 | Kassar | B60W 40/06 |
| 2020/0079388 | A1 * | 3/2020 | Kenyon | G08G 1/0145 |

(Continued)

FOREIGN PATENT DOCUMENTS

| | | | |
|---|---|---|---|
| CN | 107416754 | B | 11/2018 |
| CN | 112313129 | A | 2/2021 |

(Continued)

OTHER PUBLICATIONS

Machine translation for EP4390321A1 (Year: 2022).*

(Continued)

*Primary Examiner* — Jess Whittington
*Assistant Examiner* — Lidia Kwiatkowska
(74) *Attorney, Agent, or Firm* — Jeffri A. Kaminski; Venable LLP

(57) ABSTRACT

A computer system including a processor device configured to determine lateral offsets to a predefined path for a set of vehicles is provided. The processor device is configured to, for each vehicle in the set of vehicles, obtain an indication of a load exerted on a ground surface of the respective vehicle. The processor device is further configured to, determine lateral offsets for the set of vehicles. The lateral offsets are determined to laterally distribute the loads of the set of vehicles relative to the predefined path. The processor device is further configured to, for each vehicle in the set of vehicles, trigger the respective vehicle to travel the predefined path using the determined respective lateral offset.

13 Claims, 8 Drawing Sheets

(52) U.S. Cl.
CPC . *B60W 2530/10* (2013.01); *B60W 2554/4041* (2020.02); *B60W 2554/802* (2020.02); *G05D 2109/10* (2024.01)

(58) Field of Classification Search
CPC ...... G05D 2109/10; G05D 1/646; G05D 1/69; G05D 2105/28; G05D 2107/13; G08G 1/096725; G08G 1/096741; G08G 1/165; G08G 1/166; G08G 1/202; G08G 1/096775
See application file for complete search history.

(56) References Cited

U.S. PATENT DOCUMENTS

| | | | |
|---|---|---|---|
| 2020/0189583 | A1 | 6/2020 | Tatourian |
| 2021/0171028 | A1 | 6/2021 | Stählin |

FOREIGN PATENT DOCUMENTS

| | | | | |
|---|---|---|---|---|
| EP | 4386709 | A1 | 6/2024 | |
| EP | 4390321 | A1 * | 6/2024 | ............. G01C 21/34 |
| WO | 2020055804 | A1 | 3/2020 | |

OTHER PUBLICATIONS

Extended European Seach Report in corresponding European Application No. 22214552.6 dated May 8, 2023 (9 pages).
European Communication pursuant to Article 94(3) EPC dated Jun. 10, 2025 in corresponding European Patent Application No. 22214552.6, 10 pages.
European Communication pursuant to Article 94(3) EPC dated Feb. 19, 2025 in corresponding European Patent Application No. 22214552.6, 6 pages.

* cited by examiner

PATH DETERMINATION FOR VEHICLES

TECHNICAL FIELD

The disclosure relates generally to path determination for vehicles. In particular aspects, the disclosure relates to determining lateral offsets to a predefined path. The disclosure can be applied in heavy-duty vehicles, such as trucks, buses, and construction equipment. Although the disclosure may be described with respect to a particular vehicle, the disclosure is not restricted to any particular vehicle.

BACKGROUND

When autonomous vehicles travel predefined paths, the vehicles typically follow the predefined paths with a very high precision. This is since their navigation systems may be very precise and wheels of the autonomous vehicle may follow the predefined path up to a centimeter level precision. This means that the wear of the predefined path will be exaggerated, and ruts, ridges, deformations and potholes will emerge quickly as the wheels will travel at the exact same place in the predefined path. The problem occurs for a single vehicle iterating the same predefined path multiple times and/or when many vehicles are driving the same predefined path. This means that vehicles will operate at a lower performance as the path may have worse traction and wheels may slip into ruts or potholes of the predefined path. Furthermore, maintenance of the predefined path may need to be performed often to ensure an even surface for the autonomous vehicles to travel on. Hence, there is a strive to more efficiently reduce wear caused by autonomous vehicles travelling a predefined path.

SUMMARY

According to a first aspect of the disclosure, a computer system comprising a processor device configured to determine lateral offsets to a predefined path for a set of vehicles is provided. The set of vehicles are arranged to travel on the predefined path. The processor device is further configured to, for each vehicle in the set of vehicles, obtain an indication of a load exerted on a ground surface of the respective vehicle. The processor device is further configured to, determine lateral offsets for the set of vehicles. Each lateral offset is determined for a respective vehicle in the set of vehicles. The lateral offsets are determined to laterally distribute the loads of the set of vehicles relative to the predefined path. The processor device is further configured to, for each vehicle in the set of vehicles, trigger the respective vehicle to travel the predefined path using the determined respective lateral offset.

The first aspect of the disclosure may seek to reduce wear of the predefined path and to improve the productivity for the set of vehicles operating therein. This is achieved by the first aspect since instead of each vehicle in the set of vehicles exerting their load on the same ground surface part of the predefined path, the exerted loads of the set of vehicles is distributed laterally in the predefined path. This reduces a wear on the predefined path and further allows the predefined path to be operated for a longer time before maintenance is necessary. As the predefined path is operable for a longer time before maintenance is necessary, the productivity of the set of vehicles is improved as they have time to perform more tasks. As the wear of the predefined path is reduced and the wear is more evenly distributed in the predefined path, the predefined path will be smoother, and will less quickly form ruts, ridges, deformations and/or potholes. In this way the lateral offsets of the set of vehicles enable a higher productivity for the set of vehicles and the set of vehicles will be less performance degraded by said ruts, ridges, deformations and/or potholes.

According to a second aspect of the disclosure, a computer-implemented method for determining lateral offsets to a predefined path for a set of vehicles is provided. The set of vehicles are arranged to travel on the predefined path. The method comprises:

- by a processor device of a computer system, for each vehicle in the set of vehicles, obtaining an indication of a load exerted on a ground surface of the respective vehicle,
- by the processor device, determining lateral offsets for the set of vehicles, wherein each lateral offset is determined for a respective vehicle in the set of vehicles, and wherein the lateral offsets are determined to laterally distribute the loads of the set of vehicles relative to the predefined path, and
- by the processor device, for each vehicle in the set of vehicles, triggering the respective vehicle to travel the predefined path using the determined respective lateral offset.

The second aspect of the disclosure may seek to reduce wear of the predefined path and to improve the productivity of vehicles operating therein. This is achieved by the second aspect since instead of each vehicle in the set of vehicles exerting their load on the same ground surface part of the predefined path, the exerted loads of the set of vehicles is distributed laterally in the predefined path. This reduces the wear on the predefined path and further allows the predefined path to be operated for a longer time before maintenance is necessary. As the predefined path is operable for a longer time before maintenance is necessary, the productivity of the set of vehicles is improved as they have time to perform more tasks. As the wear of the predefined path is reduced and the wear is more evenly distributed in the predefined path, the predefined path will be smoother, and will less quickly form ruts, ridges, deformations and/or potholes. In this way the lateral offsets of the set of vehicles enable a higher productivity for the set of vehicles and the set of vehicles will be less performance degraded by said ruts, ridges, deformations and/or potholes.

In some examples, each determined lateral offset is a respective constant lateral offset to the predefined path. In other words, the lateral offset may be a constant distance from the predefined path, e.g., in a transverse direction from a driving direction of the predefined path.

In this way, the predefined path will have a uniform and/or even distribution of load exerted on a ground surface of the respective vehicle for each part of the predefined path and thereby causes a reduced wear of the predefined path. Furthermore, as the same load exerted on the ground surface is for every part of the predefined path, it enables to simplify predicting when maintenance is needed to be performed.

In some examples, each determined lateral offset is a respective variable lateral offset to the predefined path. In this way, reduced wear for the predefined path is achieved while also keeping a flexibility of operating the set of vehicles in the predefined path.

In some examples, the respective variable lateral offset to the predefined path is configured to be variable based on a longitudinal position of the respective vehicle, when the respective vehicle is travelling the predefined path.

In this way, reduced wear for the predefined path is achieved. This is since different longitudinal positions in the predefined path may wear out differently and reduced wear is achieved by a different lateral offset in different longitudinal positions of the predefined path. For example, different parts of the predefined path may have a different width and/or surface material.

In some examples, the respective variable lateral offset to the predefined path is configured to be variable based on a variable width of the predefined path.

In this way, the load exerted by the set of vehicles to the ground surface of the predefined path will be dynamically distributed over the predefined path independently of how a width changes in the path, and thereby wear is reduced in the predefined path.

In some examples, the predefined path comprises a set of segments. In some of these examples, determining the lateral offsets for the set of vehicles comprises determining a respective lateral offset for each respective segment for each respective vehicle. The lateral offsets for the set of segments may be determined to laterally distribute the loads of the set of vehicles relative to the predefined path for each respective segment. In other words, the load exerted by the set of vehicles to the ground surface may have a different distribution depending on which segment in the set of segments they are respective travelling.

In this way, a reduced wear of the predefined path is achieved. This is since different segments may need to have a different distribution of load exerted to the ground surface for a further reduced wear on the predefined path for each respective segment. For example, different segments in the set of segments may have different characteristics, e.g., any one or more out of different width, different surface types, different inclinations, different allowed or set speed for the set of vehicles, which all may affect how the load exerted to the ground surface shall best be distributed for a further reduced wear on the predefined path.

In some examples, the lateral offsets for at least one segment in the set of segments are determined such that the set of vehicles can travel the at least one segment in two different directions while reducing wear of the predefined path.

The respective at least one segment of the predefined path may in this way be used by the set of vehicles in both two different directions in a manner which reduces wear on the predefined path. This allows for the at least one segment to be travelled in the different directions, without a first vehicle in the set of vehicles having to wait for a second vehicle in the set of vehicles to exit the respective at least one segment in one direction before the first vehicle can drive in an opposite direction.

In some examples, the method further comprises, by the processor device, obtaining an indication of a first position. The first position is in this example a current or estimated future position of any one out of: an obstacle, manual actor, and/or a separate vehicle in the predefined path. In these examples, determining the lateral offset of the set of vehicles is based on the first position.

In other words, the lateral offsets may be determined to account for the first position such that they are not in the way for the set of vehicles. In this way, the set of vehicles are enabled to reduce the wear of the predefined path while still accounting for dynamic objects that may be in the predefined path.

In some examples, the method further comprises, by the processor device, obtain an indication of a second position in the predefined path. In these examples, the second position being a position wherein at least one vehicle in the set of vehicles has detected a poor traction in the predefined path. In these examples, determining the lateral offsets of the set of vehicles is based on the obtained second position.

In other words, the lateral offsets may be determined to account for the second position such that it is not travelled by the set of vehicles. In this way, wear of the predefined path is reduced. This is since if the second position has low traction, it is likely that the position is damaged and/or weak and travelling said position may cause potholes etc. which would affect a wear of a larger area of the predefined path.

In some examples, the method further comprises, by the processor device of the computer system, obtaining an indication that a load exerted on a ground surface by at least one vehicle in the set of vehicles has changed. In these examples, by the processor device, updating the lateral offsets for the set of vehicles, based on the obtained indication that the load exerted on the load surface has changed. In other words, the lateral offsets may be determined again, and/or iteratively, when it is detected that the load exerted on a ground surface by the at least one vehicle in the set of vehicles has changed. This may for example be detected if the indication indicates that a vehicle in the set of vehicles has been loaded or unloaded.

In this way, a reduced wear in the predefined path is achieved. This is since when the load exerted on a ground surface by the at least one vehicle in the set of vehicles has changed, a lower wear on the predefined path may be attained by redistributing the loads laterally on the predefined path.

The second aspect of the disclosure may seek to reduce wear of the predefined path. The technical benefit further corresponds to the technical benefit of the first aspect.

According to a third aspect of the disclosure, a vehicle comprising a computer system is provided. The computer system may be the computer system of the first aspect. The computer system may be configured to perform the method of the first aspect. The vehicle may be at least partly autonomous. The vehicle is a vehicle in the set of vehicles.

According to a fourth aspect of the disclosure, a computer program product is provided. The computer program product comprises program code for performing, when executed by a processor device, the method of the first aspect.

According to a fifth aspect of the disclosure, a control system is provided. The control system comprises one or more control units configured to perform the method of the first aspect.

According to a sixth aspect of the disclosure, a non-transitory computer-readable storage medium is provided. The non-transitory computer-readable storage medium comprises instructions, which when executed by the processor device, cause the processor device to perform the method of the first aspect.

Technical benefits of the third, fourth, fifth, and sixth aspects may respectively correspond to the technical benefits of the first and/or second aspects.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Exemplary embodiments herein relates to reducing wear on a predefined path.

This may particularly be relevant when a surface of a predefined path is soft and/or easily affected by a load being applied to it. The exemplary embodiments herein in particularly may relate to autonomous vehicles. This is since for autonomous vehicles, navigation systems and vehicle control may be so precise that when driving repeatedly the same predefined path, the autonomous vehicle(s) will follow the same path by a very small error margin, i.e. smaller than a predefined threshold. This leads to an increased wear over time of the road, where ruts, ridges, deformations and/or potholes may quickly start to form which increases a need for maintenance of the predefined path and will affect the performance of the vehicle control, as the ruts, ridges, deformations and potholes will be a disturbance to the autonomous vehicles. For example, when driving in deep tire tracks, a vehicle wants to stay in the tire tracks, pulling the vehicle back to the track when trying to control the vehicle. Such a scenario deteriorates the control and productivity of the vehicle. Hence, there is a need to reduce road wear for predefined paths travelled by one or more vehicles.

Figure 1:
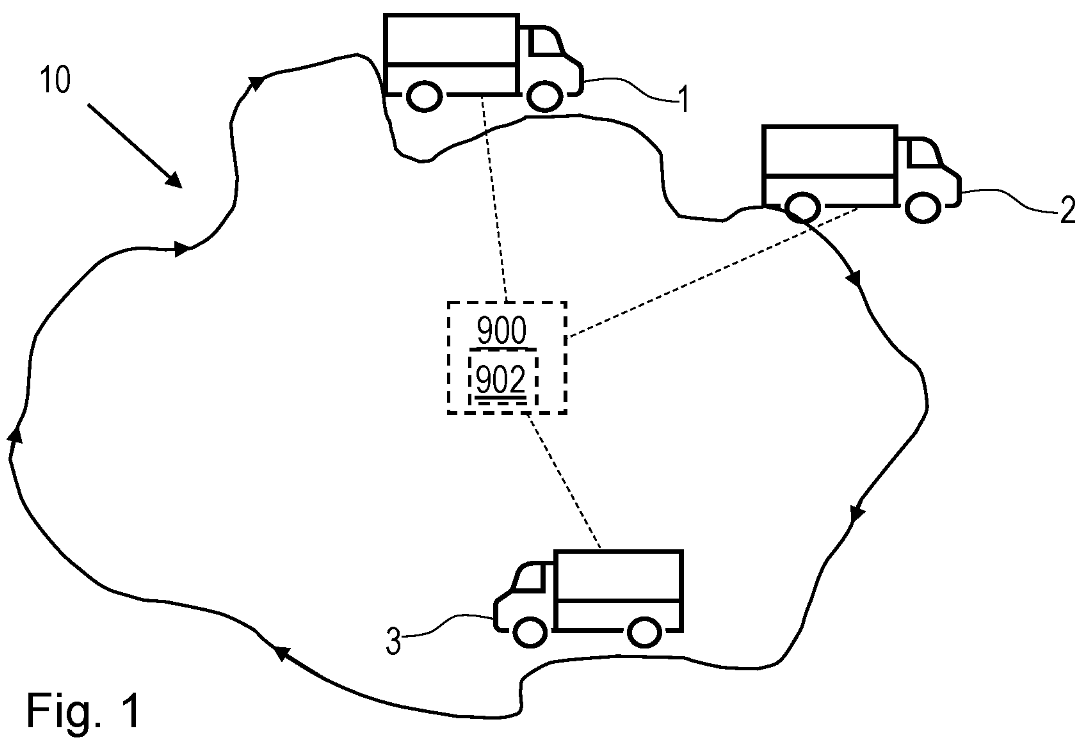
FIG. 1 is a diagram illustrating a set of vehicles and a predefined path according to one example.

FIG. 1 is an exemplary scenario of embodiments herein relates to a set of vehicles 1, 2, 3, travelling a predefined path 10. The set of vehicles 1, 2, 3 may comprise any suitable vehicle, e.g., one or more of a car, bus, heavy-duty vehicle, truck, construction equipment, etc. The set of vehicles 1, 2, 3 may comprise any suitable n number of vehicles, where n is a positive integer. The at least one vehicle 1 in the set of vehicles 1, 2, 3 may comprise any suitable ground engaging members for propelling the respective vehicle in a driving direction, e.g., wheels and/or crawler members.

The predefined path 10 may be a path wherein the set of vehicles 1, 2, 3 are arranged to travel. Typically the set of vehicles 1, 2, 3, are arranged to respectively perform one or more tasks in the predefined path, e.g., loading and/or unloading goods at certain positions in the predefined path. The predefined path 10 may have a set driving direction. The predefined path may however have some parts overlapping with an opposite driving direction. These parts may be referred to as that the predefined path has two driving directions. In these scenarios there is a need to coordinate if/when/which vehicle in the set of vehicles 1, 2, 3, may drive in the predefined path 10 at the same time, and/or to coordinate that the set of vehicles 1, 2, 3, can drive past each other in said parts of the predefined path 10.

When discussing the predefined path 10 of embodiments herein, the predefined path 10 may comprise a virtual line or other identifier of exactly where the set of vehicles 1, 2, 3 are planned to travel, e.g., with a predefined error margin. The virtual line of the predefined path may be a trajectory to be travelled by the set of vehicle 1, 2, 3, if they would not be configured with any lateral offset. Furthermore the predefined path 10 may additionally comprise a set of sides and a width, i.e. the predefined path 10 as used herein may not be only where set of vehicles 1, 2, 3 are planned to travel, but may span the entire ground surface travelable by the set of vehicles 1, 2, 3, e.g., such as to cover the entire width of the predefined path 10. In other words, when discussing the wear of the predefined path 10, this may imply the entire ground surface travelable by the set of vehicles 1, 2, 3, and not only the virtual line or the other identifier of exactly where the set of vehicles 1, 2, 3 are planned to travel. In embodiments herein, lateral offsets as used herein may be with respect to the virtual line or the other identifier of exactly where the set of vehicles 1, 2, 3 are planned to travel.

The set of vehicles 1, 2, 3, may be arranged to travel the predefined path using a set speed and/or a set maximum allows speed. The set speed and/or the set maximum allowed speed may be different for different vehicles in the set of vehicles 1, 2, 3, and/or may be different in different parts of the predefined path 10.

The set of vehicles 1, 2, 3, may be arranged to travel the predefined path according to a drive plan such that they are arranged to be at a respective set position of the predefined path based on a time schedule. The respective set position may be a set longitudinal position, i.e. a set position along the driving direction of the predefined path 10.

In some exemplary embodiments, the set of vehicles 1, 2, 3, comprises only one vehicle which iterates travelling the predefined path 10 multiple times.

In some exemplary embodiments, the set of vehicles 1, 2, 3, comprises multiple vehicles which travel the predefined path a single time.

In some exemplary embodiments, the set of vehicles 1, 2, 3, comprises multiple vehicles which iterates travelling the predefined path multiple times.

In some exemplary embodiments the set of vehicles 1, 2, 3, is a dynamic set of vehicles wherein the number of vehicles comprised in the set may increase and/or decrease at any suitable time, e.g., when the vehicles in the set of vehicles 1, 2, 3, travel the predefined path 10.

The predefined path 10 may comprise any surface which is be prone to wear, e.g., when travelled across by a vehicle, e.g., the at least one vehicle 1. In a particular example, the drivable surface 10 may comprise any surface which is easily affected by loads applied by vehicles, e.g., soft surfaces, such as any one or more out of: sand, gravel, mud, dirt, snow, and/or a combination thereof.

The set of vehicles 1, 2, 3, may comprise autonomous vehicles and/or at least partly autonomous vehicles. In other words, the set of vehicles 1, 2, 3, may be arranged to travel the predefined path at least partly without a direct control of a user.

Each respective vehicle in the set of vehicles 1, 2, 3, may comprise any suitable sensor e.g., for navigation/positioning of the set of vehicles 1, 2, 3, and/or for detecting obstacles, manual actors, walls, etc. in the predefined path 10. The sensor may comprise e.g., any one or more out of: Light detection and ranging (Lidar), one or more cameras, infrared cameras, Global Navigation Satellite System (GNSS) such as Global positioning system (GPS), or any other suitable sensor.

The predefined path 10 may be a path planned for the set of vehicles 1, 2, 3, to reach a destination or to perform a mission.

As the predefined path 10 may be prone to wear, embodiments herein comprise triggering the set of vehicles 1, 2, 3 to travel the predefined path 10 using a determined respective lateral offset 11, 12, 13. The respective lateral offsets are determined based on a load exerted on a ground surface of each respective vehicle in the set of vehicles 1, 2, 3, and the lateral offsets 11, 12, 13 are determined to laterally distribute the loads of the set of vehicles 1, 2, 3 relative to the predefined path 10. In other words, the load of the set of vehicles 1, 2, 3 will be distributed over the path such that each lateral part of the path being exerted with only a part of the load, instead of one single lateral part being exerted with all of the load, e.g., as would be the case without a lateral offset.

Embodiments herein allows the predefined path 10 to have an even distribution or at least a less uneven distribution of load exerted on a ground surface of the predefined path 10, e.g., by laterally distributing the load exerted by the set of vehicles 1, 2, 3.

The load exerted on the ground surface of the predefined path 10 may further be determined by the respective lateral offsets 11, 12, 13, such that the load is distributed to be even or at least less uneven over a period of time. For example, it may not be possible to determine lateral offsets 11, 12, 13, to evenly distribute the load exerted on the ground surface for one iteration of the predefined path 10.

However, the lateral offsets 11, 12, 13, may be updated and/or determined again after one iteration, a set time period, or a triggered event, and thereby the load exerted on the ground surface of the predefined path 10 may be distributed laterally in an even manner over time, even if the set of vehicles 1, 2, 3 only comprises one vehicle. For such scenarios, the lateral offsets 11, 12, 13 may need to be logged for each iteration of the predefined path, and determining the lateral offsets 11, 12, 13, may be based on previous lateral offsets.

When the predefined path 10 is evenly worn out, the set of vehicles 1, 2, 3 will more easily be controlled in the predefined path 10, as opposed to when the predefined path 10 is unevenly worn out which would quickly cause ruts, ridges, deformations and potholes, etc., which causes difficulties for the set of vehicles 1, 2, 3, to drive into. Furthermore, when the predefined path 10 is evenly worn out, a lifetime of the predefined path 10 is increased as the predefined path 10 can be used longer without maintenance.

Embodiments herein may be performed at least partly by a computer system 900, and a processor device 902 therein. The computer system 900 may be comprised in any one vehicle out of the set of vehicles 1, 2, 3, or may be comprised at a remote location communicatively coupled to the set of vehicles 1, 2, 3, e.g., in a server or control station e.g., which may be arranged to at least partly remotely control and/or to provide instructions, such as the respective lateral offset to the respective vehicle in the set of vehicles 1, 2, 3. The computer system 900 and/or the processor device 902 therein may be able to communicate with each respective vehicle in the set of vehicles 1, 2, 3. The computer system 900 and/or the processor device 902 therein may further, directly or indirectly, control and/or communicate with any suitable entity comprised in the set of vehicles 1, 2, 3. The computer system 900 and/or the processor device 902 therein may further be able to trigger the set of vehicles 1, 2, 3 to travel the predefined path 10 using a determined using the determined lateral offsets 11, 12, 13.

Figure 2:
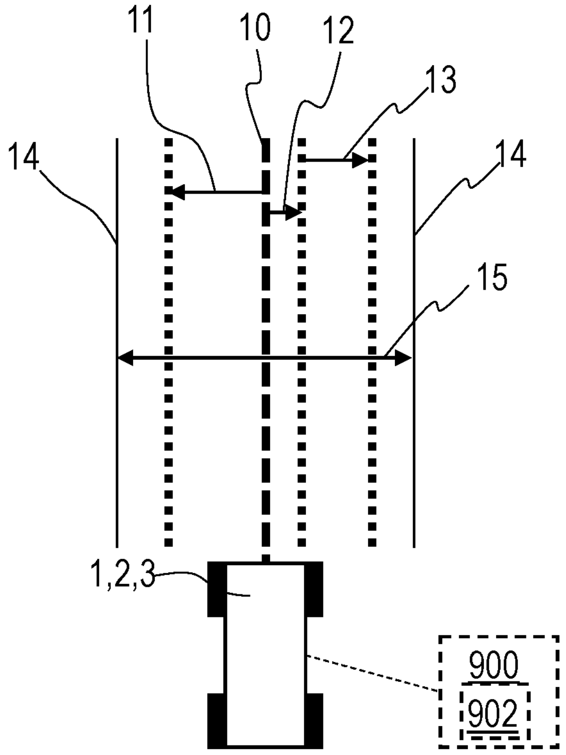
FIG. 2 is another view of FIG. 1, according to another example.

FIG. 2 is another view of FIG. 1, according to another example.

FIG. 2 illustrates the computer system 900 comprising the processor device 902 configured to determine lateral offsets 11, 12, 13 to the predefined path 10 for the set of vehicles 1, 2, 3. The set of vehicles 1, 2, 3 are arranged to travel on the predefined path 10.

The processor device 902 is further configured to, for each vehicle in the set of vehicles 1, 2, 3, obtain an indication of a load exerted on a ground surface of the respective vehicle.

The processor device 902 is further configured to, determine the lateral offsets 11, 12, 13 for the set of vehicles 1, 2, 3. Each lateral offset is determined for a respective vehicle in the set of vehicles 1, 2, 3. The lateral offsets 11, 12, 13 are determined to laterally distribute the loads of the set of vehicles 1, 2, 3 relative to the predefined path 10.

The processor device 902 is further configured to, for each vehicle in the set of vehicles 1, 2, 3, trigger the respective vehicle to travel the predefined path 10 using the determined respective lateral offset.

As mentioned with respect to above FIG. 1, the predefined path 10 may additionally comprise a set of sides 14 and a width 15.

Figure 3:
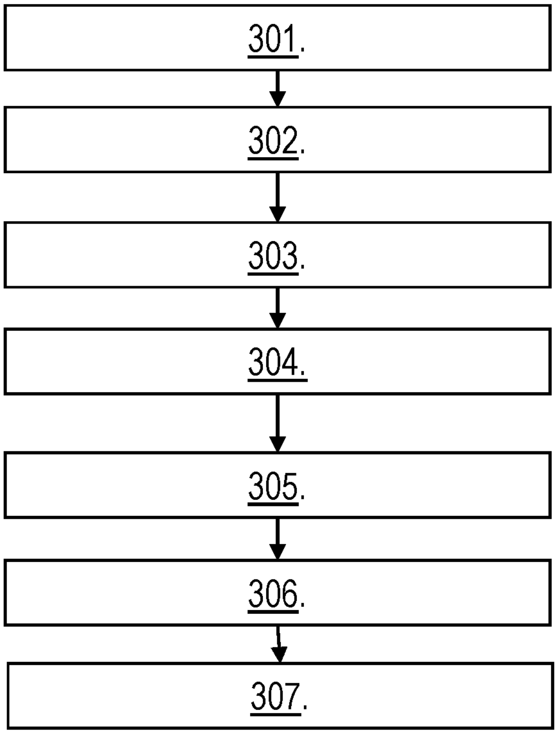
FIG. 3 is a flow chart of an exemplary method according to one example.

FIG. 3 is a flow chart of an exemplary computer-implemented method for determining the lateral offsets 11, 12, 13 to the predefined path 10 for the set of vehicles 1, 2, 3, the vehicles in the set of vehicles 1, 2, 3 being arranged to travel on the predefined path 10. The method may be performed by the computer system 900, in particular the processor device 902. The method comprises the following actions, which actions may be taken in any suitable order. The exemplary method of FIG. 3, may be performed periodically and/or at a suitable event which could cause a need to redistribute loads laterally along the predefined path 10.

Action 301.

The method comprises, by the processor device 902 of the computer system 900, for each vehicle in the set of vehicles 1, 2, 3, obtaining an indication of a load exerted on a ground surface of the respective vehicle.

The indication of the load may be obtained in any suitable manner.

In some exemplary embodiments, obtaining the indication of the load exerted on a ground surface of the respective vehicle may comprise receiving the indication from the respective vehicle. The indication may for example be a weight of the vehicle, e.g., including its load.

In some exemplary embodiments, obtaining the indication of the load exerted on a ground surface of the respective vehicle may comprise determining the load exerted on the ground surface based on a drive plan of the respective vehicle. For example, it may be known where in the predefined path 10 the respective vehicle is loading and/or unloading goods. Additionally, an initial weight of the vehicle may be predetermined. Determining the load exerted on the ground surface based on a drive plan of the respective vehicle may then be performed based on any one or more out of:

where in the predefined path 10 the respective vehicle is loading and/or unloading goods, when loaded, a weight measurement or estimate of the loaded goods, the respective vehicles position in the predefined path 10, and an initial weight of the vehicle.

The initial weight of the vehicle may be a predetermined weight, e.g., factory weight, or the initial weight may be a weight of the vehicle as weighed before travelling on the predefined path 10. The initial weight may or may not include weight of a load loaded on the vehicle.

In some exemplary embodiments, the respective load exerted by the respective vehicle may be predefined, e.g., based on any one or more out of a size, dimensions, and the initial weight of the respective vehicle.

Action 302.

In some exemplary embodiments, the method comprises, by the processor device 902, obtaining an indication of a first position. The first position is a current or estimated future position of any one out of: an obstacle, a manual actor, and a separate vehicle, in the predefined path 10.

In some exemplary embodiments, obtaining the first position may comprise, receiving the first position of a first vehicle in the set of vehicles 1, 2, 3. In other words, the first vehicle may detect the object at the first position and transmit the first position in the predefined path 10 to the processor device 902 and/or to the other vehicles in the set of vehicles 1, 2, 3. The object may be any one out of: the obstacle, the manual actor, and the separate vehicle, in the predefined path 10.

The first vehicle may detect the object at the first position by measuring the first position by any suitable sensor, e.g., a Lidar sensor and/or camera. Alternatively the first vehicle may detect the object at the first position by sensors detecting the first vehicle travelling over the first object.

In an example scenario, one of the vehicles in the set of vehicles 1, 2, 3 may accidentally drop one or more objects it is transporting in the predefined path 10. The object may then pose a danger to travel over the first position, or the object may reduce productivity as it will be in the way of the set of vehicles 1, 2, 3.

In another example scenario, a maintenance vehicle, e.g., part of or not part of the set of vehicles 1, 2, 3, may be scheduled to drive in the predefined path 10, e.g., the maintenance vehicle may be a grader vehicle or a snowplow vehicle, etc. In these scenarios, a route of the maintenance vehicle and/or the first position of the maintenance vehicle may be obtained by the processor device 902, e.g., by any one or more out of: receiving an indication of the route from signaling by the maintenance vehicle, and/or by obtaining a predefined drive plan for the maintenance vehicle, which drive plan indicates the route of the maintenance vehicle, e.g., indicating a speed and/or time plan of the maintenance vehicle.

Action 303.

In some exemplary embodiments, the method comprises, by the processor device 902, obtaining an indication of a second position in the predefined path 10, the second position being a position wherein at least one vehicle in the set of vehicles 1, 2, 3 has detected a poor traction in the predefined path 10.

In some exemplary embodiments, obtaining the second position may comprise receiving the second position from a second vehicle in the set of vehicles 1, 2, 3. In other words, the second vehicle may detect the poor traction of the second position when driving over the second position. Alternatively, the second vehicle may comprise a sensor, e.g., a camera, which detect that the second position has poor traction when the second vehicle drives in proximity to the second location, e.g., within a sensing range of the sensor of the second vehicle.

In some exemplary embodiments, the poor traction is detected based on a slip detection in the second vehicle.

The second vehicle may then transmit the second position in the predefined path 10 to the processor device 902 and/or to the other vehicles in the set of vehicles 1, 2, 3.

Action 304.

The method comprises, by the processor device 902, determining the lateral offsets 11, 12, 13 for the set of vehicles 1, 2, 3. Each lateral offset is determined for a respective vehicle in the set of vehicles 1, 2, 3. The lateral offsets 11, 12, 13 are determined to laterally distribute the loads of the set of vehicles 1, 2, 3 relative to the predefined path 10. In other words, the load exerted by the set of vehicles 1, 2, 3, to a ground surface of the predefined path 10 will be distributed over the predefined path thereby reducing the wear of the predefined path 10.

The lateral offsets 11, 12, 13 may be bounded by a width of the predefined path 10.

As one example, a first vehicle in the set of vehicles 1, 2, 3 may be offset to travel with an offset 20 centimeters to the left of the predefined path 10, but still travel along the predefined path 10 in a longitudinal direction. A second vehicle in the set of vehicles 1, 2, 3 may be offset to travel with an offset 20 centimeters to the right of the predefined path 10, but still travel along the predefined path 10 in a longitudinal direction. A third vehicle in the set of vehicles 1, 2, 3 may not be offset at all, i.e. a 0 centimeter offset, and travel along the predefined path 10 in a longitudinal direction.

Each lateral offset may respectively be an offset in a lateral direction of the predefined path 10. The lateral direction being transverse to a predefined driving direction of the predefined path 10.

In some exemplary embodiments, determining the lateral offset of the set of vehicles 1, 2, 3 is based on the obtained first position. In other words, at least within a first range of the first position, the lateral offsets of the set of vehicles 1, 2, 3, may be determined such that the set of vehicles 1, 2, 3 are refraining from driving over the first position. Instead, the lateral offsets are, at least within the first range of the first position, determined to be laterally distributed over the remaining width of the predefined path. The first range may be a predefined range. The first range may be different based on whether or not the object in the first position is static or moving. If the object in the first position is moving, e.g., a vehicle, as obtained in action 302, the first range may be dependent on an obtained or estimated speed of the vehicle.

Additionally or alternatively, in a corresponding manner, determining the lateral offset of the set of vehicles 1, 2, 3 is based on the obtained second position. In other words, at least within a second range of the second position, the lateral offsets of the set of vehicles 1, 2, 3, may be determined such that the set of vehicles 1, 2, 3 are refraining from driving over the second position. Instead, the lateral offsets are, at least within the second range of the second position, determined to be laterally distributed over the remaining width of the predefined path. The second range may be a predefined range.

In some exemplary embodiments, each determined lateral offset is a respective constant lateral offset to the predefined path 10. For example, each lateral offset may be a set centimeter offset to the predefined path 10.

In some exemplary embodiments, each determined lateral offset is a respective variable lateral offset to the predefined path 10.

In some exemplary embodiments, the respective variable lateral offset to the predefined path 10 is configured to be variable based on a longitudinal position of the respective vehicle, when the respective vehicle is travelling the predefined path 10.

For example, for wide parts of a predefined path, e.g., with a respective width wider than a threshold, each vehicle in the set of vehicles 1, 2, 3 may drive exclusively using their own lateral offset with no overlap with other vehicles in the set of vehicles 1, 2, 3 of where laterally in the predefined path they respectively exert load on the ground surface. However, for narrow parts with smaller width than the wide parts of the predefined path, e.g., with a respective width lower than the threshold, the one or more vehicles in the set of vehicles 1, 2, 3 may need to exert their load on at least partly the same ground surface as other vehicles in the set of vehicles. In these situations, the lateral offsets need to be determined such that a total load exerted by the set of vehicles 1, 2, 3 to the ground surface is evenly or at least less unevenly distributed over the predefined path, or distributed according to any suitable distribution, e.g., based on the type of surface in the predefined path. For example, for some surfaces, a lower load, e.g., below a threshold, may need to be exerted on the edges of the predefined path, e.g., within a range of the edges.

In some exemplary embodiments, high load vehicles in the set of vehicles 1, 2, 3, with a load above a threshold and/or with an axle load above a threshold, may be configured to be constrained to a lateral offset below a threshold and/or such that the lateral offset restricts the high load vehicles to travel at least a predefined distance from a side of the predefined path 10. In a corresponding manner low load vehicles in the set of vehicles 1, 2, 3, with a load below a threshold and/or with an axle load below a threshold, may be configured to be constrained to a lateral offset above a threshold and/or such that the lateral offset restricts the low load vehicles to travel at least a predefined distance from a center of the predefined path 10. This avoids the high load vehicles to damage soft and more fragile sides of the predefined path 10, which otherwise can be easily pressed down and destroyed if travelled by the high load vehicles.

In some exemplary embodiments, a first type of vehicle in the set of vehicles 1, 2, 3, may be defined, e.g., predetermined, to be a high load vehicle or a low load vehicle, e.g., based on a model of the first type of vehicle.

In some exemplary embodiments, an even distribution is not possible to achieve, hence, exemplary embodiments herein may be aimed at that the load exerted by the set of vehicles 1, 2, 3, shall be as even as possible, at least more evenly distributed than if all vehicles would drive in the same trajectory.

In some exemplary embodiments, the respective variable lateral offset to the predefined path 10 is configured to be variable based on a variable width of the predefined path 10. For example, each lateral offset may be determined to be a ratio of the width of the predefined path 10.

In this way, the load exerted by the set of vehicles 1, 2, 3 to the ground surface of the predefined path will be dynamically distributed over the predefined path independently of how a width changes in the path, and thereby wear is reduced in the predefined path 10.

In some exemplary embodiments, the predefined path 10 comprises a set of segments. In these embodiments, determining the lateral offsets 11, 12, 13 for the set of vehicles 1, 2, 3 may comprise determining a respective lateral offset for each respective segment for each respective vehicle. The lateral offsets 11, 12, 13 for the set of segments may be determined to laterally distribute the loads of the set of vehicles 1, 2, 3 relative to the predefined path for each respective segment.

In other words, embodiments herein may be performed separately for each segment in the predefined path.

In this way, a reduced wear of the predefined path 10 is achieved. This is since different segments in the set of segments may need to have a different distribution of load exerted to the ground surface for a further reduced wear on the predefined path 10 for each respective segment. For example, different segments in the set of segments may have different characteristics, e.g., any one or more out of different width, different surface types, different inclinations, different curvatures, different allowed or set speed for the set of vehicles, which all may affect how the load exerted to the ground surface shall best be distributed for a further reduced wear on the predefined path 10.

In some exemplary embodiments, the lateral offsets 11, 12, 13 for at least one segment in the set of segments are determined such that the set of vehicles 1, 2, 3 can travel the at least one segment in two different directions.

In other words, the predefined path 10 may use each of the at least one segment in different directions. To avoid having vehicles in the set of vehicles 1, 2, 3 to wait for each other passing the at least one respective segment, the lateral offsets may be determined such that the set of vehicles 1, 2, 3, can meet each other in the at least one segment.

In this way, the respective at least one segment of the predefined path may be used by the set of vehicles 1, 2, 3 in both two different directions in a manner which reduces wear on the predefined path.

This further allows the at least one segment to be travelled in two different directions, without a first vehicle in the set of vehicles 1, 2, 3 having to wait for a second vehicle in the set of vehicles 1, 2, 3 to exit the respective at least one segment in one direction before the first vehicle may drive in an opposite direction.

Action 305.

The method comprises, by the processor device 902, for each vehicle in the set of vehicles 1, 2, 3, triggering the respective vehicle to travel the predefined path 10 using the determined respective lateral offset.

Triggering the respective vehicle to travel the predefined path 10 using the determined respective lateral offset may comprise triggering the respective vehicle to travel along the predefined path 10, in a driving direction of the predefined path, wherein the respective vehicle is laterally offset the predefined path based on the respective lateral offset. For example, the processor device 902 may communicate the respective lateral offset to each vehicle in the set of vehicle 1, 2, 3. Each vehicle in the set of vehicles 1, 2, 3 may be preconfigured with the predefined path 10 and may internally adjust the predefined path accordingly. As an alternative, the predefined path 10 may be adjusted for each vehicle in the set of vehicles 1, 2, 3, according to their respective lateral offset and each vehicle in the set of vehicles 1, 2, 3 may then be sent the respective adjusted predefined path.

In some examples, triggering the respective vehicle to travel the predefined path using the determined respective lateral offset comprises offsetting the predefined path 10 with the determined respective lateral for the respective vehicle.

In some examples, triggering the respective vehicle to travel the predefined path using the determined respective lateral offset comprises updating a previously set lateral offset for the predefined path 10 to replace the previously set lateral offset with the determined respective lateral for the respective vehicle.

In some examples, triggering the respective vehicle to travel the predefined path using the determined respective lateral offset comprises triggering the respective vehicle to adjust a current respective lateral offset to the determined respective lateral offset using a lateral change rate below a predefined threshold. In other words, the respective vehicle is adjusting its respective lateral offset in a slow pace as to not damage or induce further wear on a ground surface.

Action 306.

In some exemplary embodiments, the method comprises, by the processor device 902 of the computer system 900, obtaining an indication that a load exerted on a ground surface by at least one vehicle in the set of vehicles 1, 2, 3 has changed. The indication may be transmitted by each respective vehicle in the set of vehicles 1, 2, 3, e.g., as measured by one or more respective sensors of the respective vehicle.

As one example, the respective at least one vehicle may have been loaded or unloaded.

As another example, the respective at least one vehicle may have dropped cargo in the predefined path, e.g., as detected by sensors in the respective at least one vehicle.

That the load exerted on the ground surface by at least one vehicle in the set of vehicles 1, 2, 3 has changed may in some exemplary embodiments be determined by the respective at least one vehicle and the indication of that this has occurred, e.g., comprising a new load of the respective at least one vehicle, may then be transmitted to the processor device 902.

Additionally or alternatively, that the load exerted on the ground surface by at least one vehicle in the set of vehicles 1, 2, 3 has changed may in some exemplary embodiments be determined by the processor device 902, e.g., by the predefined path 10 being arranged to have loading and/or unloading spots for the respective at least one vehicle.

Action 307.

In some exemplary embodiments, the method comprises, by the processor device 902, updating the lateral offsets 11, 12, 13 for the set of vehicles 1, 2, 3. The updating may be triggered in response to and/or based on that the obtained indication that the load exerted on the load surface has changed.

The updating may be performed according to any of the above actions or embodiments.

As the lateral offsets are updated, the load exerted to the ground surface of the predefined path may be distributed more efficiently as it can be avoided that loaded vehicles always drive using one offset while unloaded vehicles drive using another offset.

The updating may further be triggered periodically and/or iteratively for each cycle in the predefined path, e.g., to ensure an even distribution of load over the predefined path 10.

Figure 4:
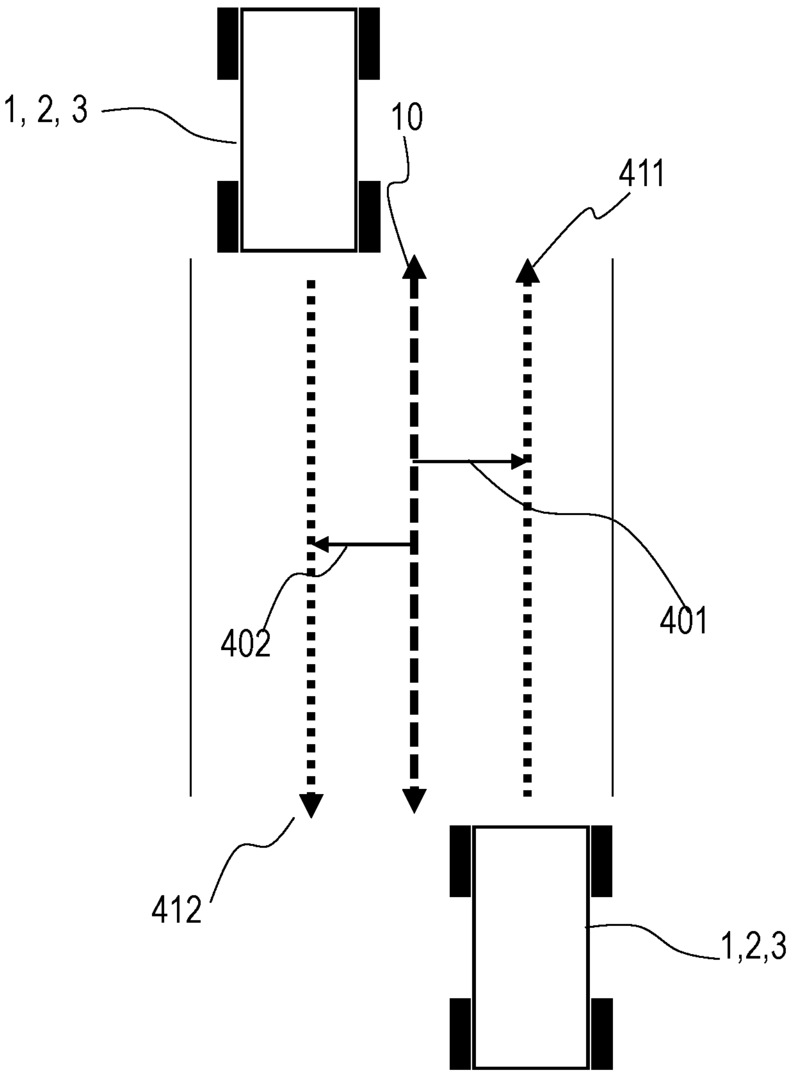
FIG. 4 is a diagram illustrating an example scenario according to embodiments herein.

FIG. 4 is a diagram illustrating an example scenario according to embodiments herein. In the example illustration of FIG. 4, the set of vehicles 1, 2, 3 are arranged to travel in one part, e.g., a segment, of the predefined path 10 in opposite directions, e.g., concurrently. In this example scenario, the lateral offsets are determined, e.g., as in action 304, such that a first vehicle out of the set of vehicles 1, 2, 3, is offset from the predefined path 10 to a first side by a first lateral offset 401, causing the first vehicle to travel along the predefined path 10 using a first adjusted path 411. In this example scenario, the lateral offsets are further determined, e.g., as in action 304, such that a second vehicle out of the set of vehicles 1, 2, 3, is offset from the predefined path 10 to a second side by a second lateral offset 402, causing the second vehicle to travel along the predefined path 10 using a second adjusted path 412. The determined lateral offsets, e.g., as determined in action 304, are determined such that the first adjusted path 411 and the second adjusted path 412 is travelable by the first and second vehicles concurrently, i.e. such that they can meet.

Figure 5:
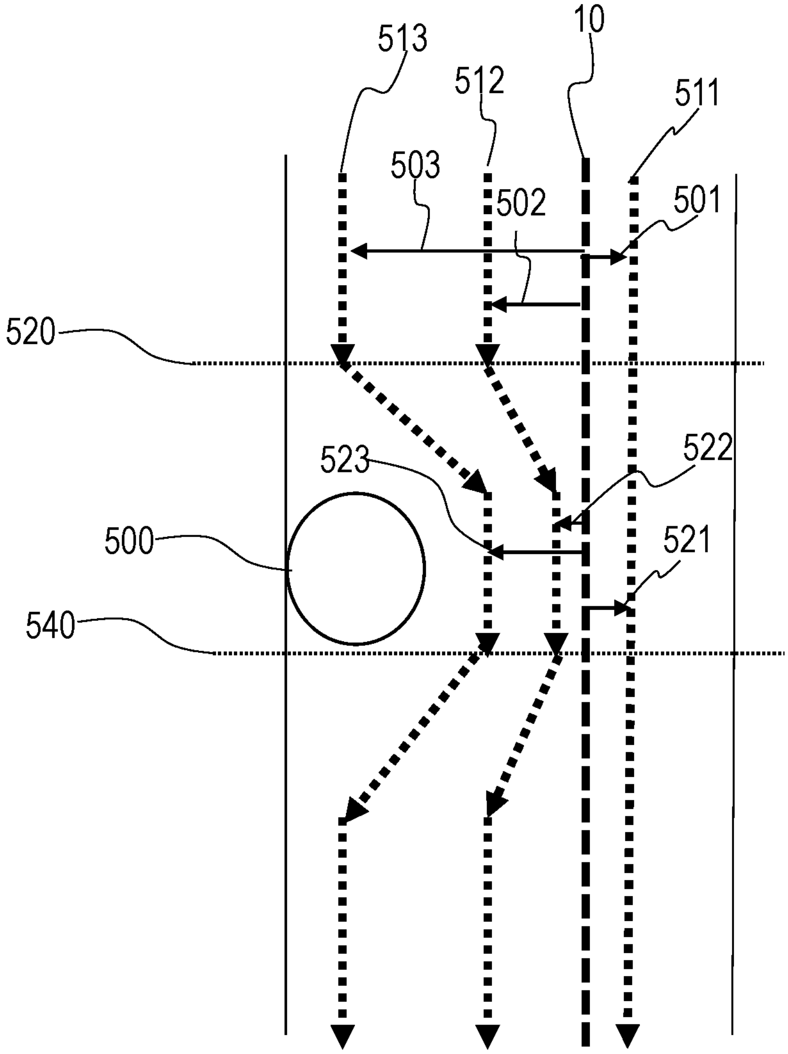
FIG. 5 is a diagram illustrating an example scenario according to embodiments herein.

FIG. 5 is a diagram illustrating an example scenario according to embodiments herein. In the example illustration of FIG. 4, the set of vehicles 1, 2, 3 are arranged to travel around an obstacle at a first position 500, e.g., as obtained in action 302. While the term position is used herein for the first position 500, the first position may be a set of positions, or an area to be driven around by the set of vehicles 1, 2, 3.

The set of vehicles 1, 2, 3 may be arranged to travel along the predefined path 10 using first lateral offsets 501, 502, 503, resulting in a respective adjusted path 511, 512, 513 along the predefined path 10.

When each vehicle in the set of vehicles 1, 2, 3 are respectively in a first range 520 of the first obstacle 500, the set of vehicles 1, 2, 3 are determined, e.g., as in action 304, to use second lateral offsets 521, 522, 523.

As illustrated in FIG. 5, the set of vehicles 1, 2, 3 may have a distance of transitioning between the first lateral offsets 501, 502, 503 and the second lateral offsets 521, 522, 523.

After passing the obstacle at the first position 500, the set of vehicles 1, 2, 3, are determined, e.g., as in action 304, to again use first lateral offsets 501, 502, 503.

In this way, the set of vehicles 1, 2, 3, can adjust dynamically to go around obstacles in the predefined path while still dynamically adjusting the load exerted on the ground surface of the predefined path 10 by the lateral offsets.

Figure 6:
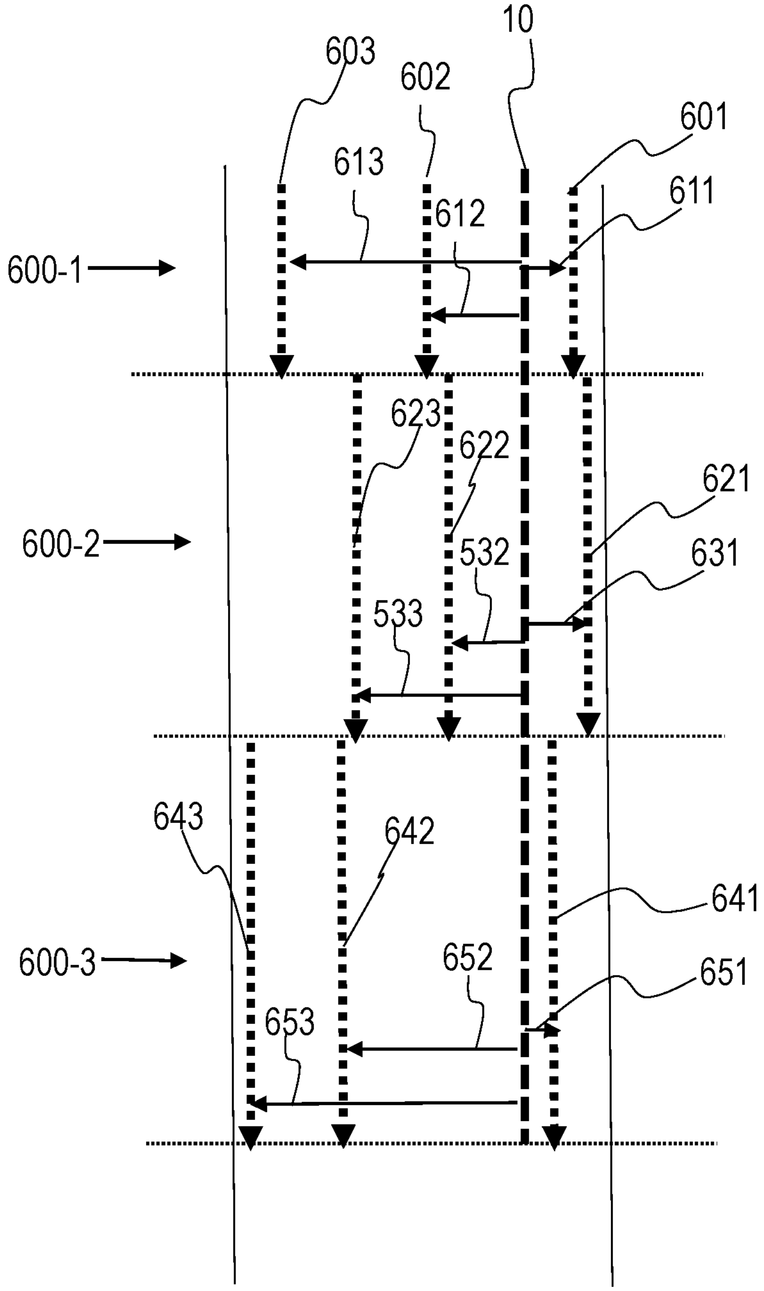
FIG. 6 is a diagram illustrating an example scenario according to embodiments herein.

FIG. 6 is a diagram illustrating an example scenario according to embodiments herein.

In the example illustration of FIG. 6, the set of vehicles 1, 2, 3 are arranged to use different lateral offsets in different segments.

In the example, the predefined path 10 is arranged in a set of segments 10.

In a first segment 600-1, the set of vehicles 1, 2, 3 is determined, e.g., as in action 304, to use first lateral offsets 611, 612, 613, resulting in a respective adjusted path 601, 602, 603.

In a second segment 600-2, the set of vehicles 1, 2, 3 is determined, e.g., as in action 304, to use second lateral offsets 631, 632, 633, resulting in a respective adjusted path 621, 622, 623.

In a third segment 600-3, the set of vehicles 1, 2, 3 is determined, e.g., as in action 304, to use third lateral offsets 651, 652, 653, resulting in a respective adjusted path 641, 642, 643.

Between using the first lateral offsets 611, 612, 613, and using the second lateral offsets 631, 632, 633, and between using the second lateral offsets 631, 632, 633, and using the third lateral offsets 651, 652, 653, the set of vehicles 1, 2, 3, may be arranged to change between lateral offsets by a predefined lateral adjustment, e.g., below a predefined threshold. This is since turning in quickly may damage the ground surface easily, and thereby lateral adjustments need to be performed with a slow pace to avoid increased wear on the predefined path 10.

Figure 7:
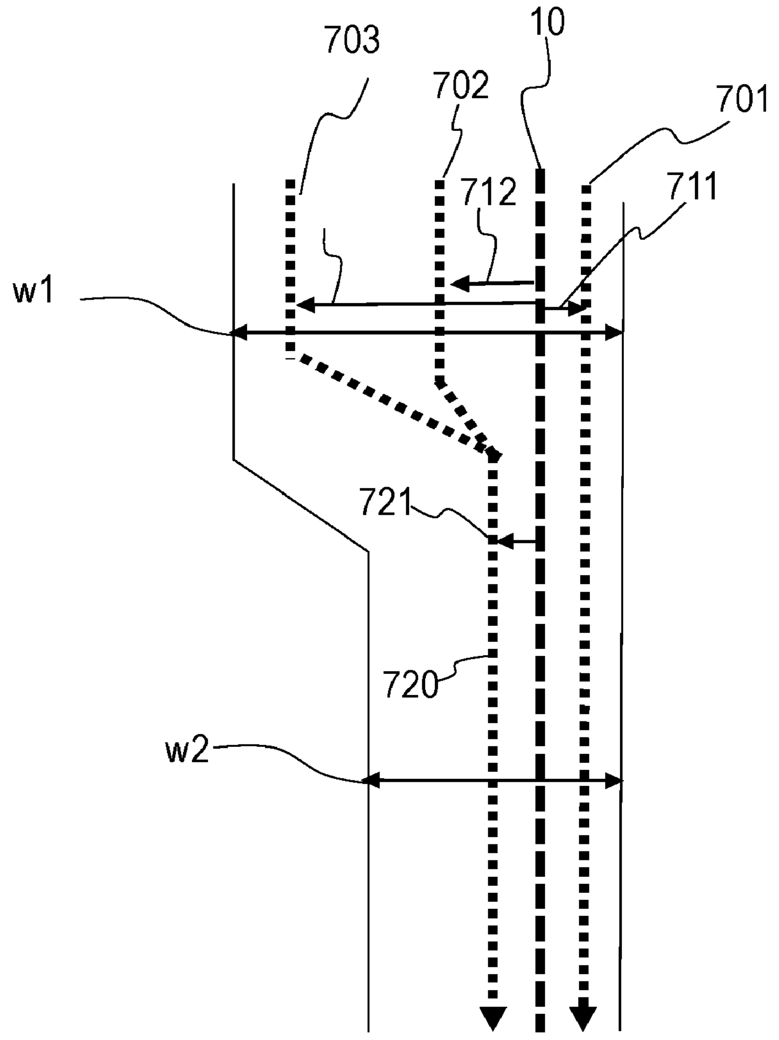
FIG. 7 is a diagram illustrating an example scenario according to embodiments herein.

FIG. 7 is a diagram illustrating an example scenario according to embodiments herein. In the example illustration of FIG. 7, the set of vehicles 1, 2, 3 are arranged to travel between parts, e.g., segments, of the predefined path 10 with different widths.

In the example, the set of vehicles 1, 2, 3 is determined, e.g., as in action 304, to use first lateral offsets 711, 712, 713, resulting in a respective adjusted path 701, 702, 703, to travel a first path of the predefined path associated with a first width w1. When the width of the predefined path is narrowing, the first lateral offsets 711, 712, 713, may not be usable, at least if they are set with a constant value, and may need to be determined for a second part of the predefined path 10 associated with a second width w2.

The first set of vehicles 1, 2, 3, may need to have an offset with finer granularity offsets than the first lateral offsets 711, 712, 713, or when the number of vehicles the set of vehicles 1, 2, 3, is a high number, as illustrated in this example, e.g., greater than a threshold, an overlap of adjusted paths, e.g., using the same lateral offsets may be needed. In FIG. 7, this is illustrated by two lateral offsets merge into one new lateral offset 721, e.g., after a new determination of lateral offsets as in action 304, resulting in a corresponding new adjusted path 720 for when the predefined path 10 is associated with the second width w2.

Figure 8:
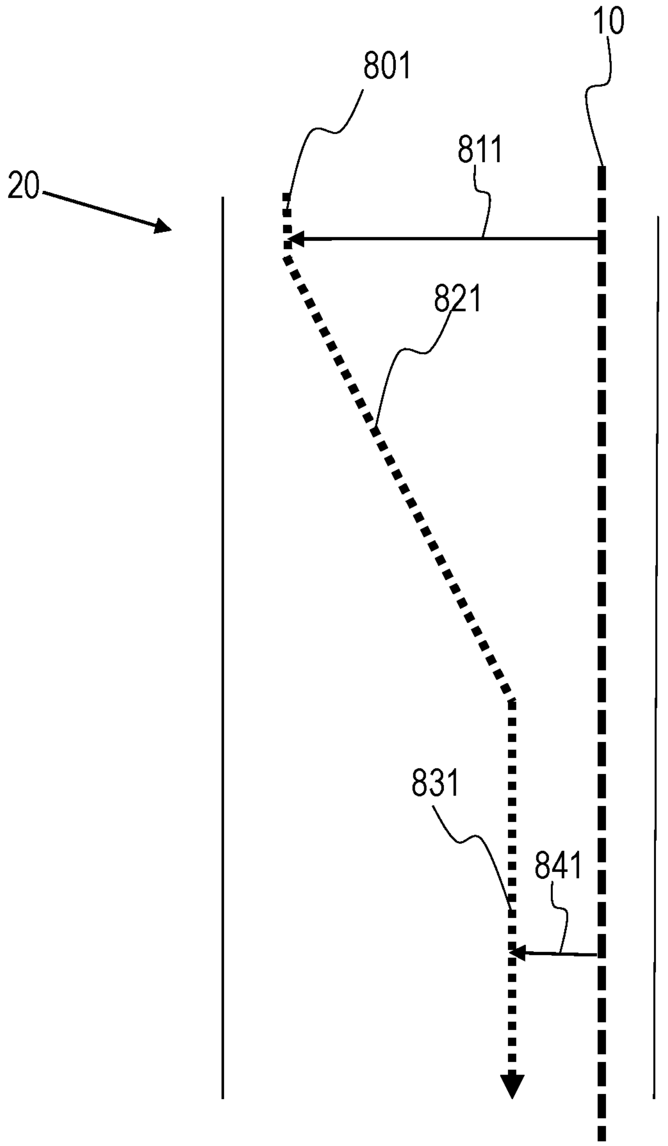
FIG. 8 is a diagram illustrating an example scenario according to embodiments herein.

FIG. 8 is a diagram illustrating an example scenario according to embodiments herein. In the example illustration of FIG. 8, at least one vehicle in the set of vehicles 1, 2, 3 are arranged to use at least a first lateral offset 811 resulting in an adjusted path 801. In this scenario, the first lateral offset 811 is triggered to be adjusted, e.g., due to a width change and/or an indicated change of load of any vehicle in the set of vehicles 1, 2, 3. In this way, the at least one vehicle in the set of vehicles 1, 2, 3, is determined, e.g., as in action 304, to use a second lateral offset 841, resulting in a second adjusted path 831. During a transition between the first lateral offset 811 and the second lateral offset 841, the at least one vehicle in the set of vehicles 1, 2, 3, may be arranged to adjust a lateral position of the at least one vehicle by a predetermined turn angle, e.g., less than a threshold. As also explained above, this is since turning in quickly may damage the ground surface easily, and thereby lateral adjustments need to be performed with a slow pace to avoid increased wear on the predefined path 10.

Variations and Further Exemplary Embodiments

In any of the above-mentioned examples and/or embodiments, a wear of the predefined path 10 may, additionally or alternatively, be obtained and/or registered by one or more vehicles in the set of vehicles 1, 2, 3, e.g., by being configured to respectively measure or estimate a load applied to, or applied by, each respective axle and/or wheel of the respective vehicle. A wear of the predefined path 10 may be determined at least partly by the respective load applied to, or applied by each respective axle and/or wheel of the respective vehicle. The wear of the predefined path 10, may be quantified as a wear value based at least partly by the respective load applied to, or applied by each respective axle and/or wheel of the respective vehicle. Each segment of the predefined path 10 may have an associated wear or wear values.

The respective load applied to, or applied by each respective axle and/or wheel of the respective vehicle may be obtained by sensors arranged on the respective vehicle, wherein the sensors may measure the axle load and/or weight. Additionally or alternatively, the respective load applied to, or applied by each respective axle and/or wheel of the respective vehicle may be estimated based on an axle configuration of the respective vehicle. The respective load may be mapped to the axle configuration of the respective vehicle to estimate the load applied by or applied to each respective axle and/or wheel of the respective vehicle. In this way, the wear may be minimized and/or accounted for with respect to each axle and/or wheel-pair estimated and/or measured exposure on the predefined path 10, e.g., by determining the lateral offsets, e.g., as in action 302, based on the wear caused by each axle's and/or wheel-pair estimated and/or measured exposure on the predefined path 10.

The estimation may be based on any one or more out of:

- the axle configuration of the respective vehicle including the position of the wheels of the respective vehicle,
- an initial weight of the respective vehicle, e.g., an unloaded weight of the respective vehicle,
- a current weight of the respective vehicle, e.g., a loaded weight of the respective vehicle, the current weight of the respective vehicle may be measured by a weight sensor on the respective vehicle, by a weighing station, and/or by a machine loading the respective vehicle, e.g., construction equipment, excavator, wheel loader, etc.

The wear and/or quantified wear value may be registered by the respectively vehicle, e.g., in the computer system 900, e.g., which registered wear and/or wear value may further be used as a basis for determining the lateral offsets in action 302 and/or for obtaining the indication of the load exerted on a ground surface of the respective vehicle as in action 301.

As one example, only wear above a preset threshold may be registered by the respective vehicle. This may mean that for some exemplary embodiments, only wear, e.g., quantified as a wear value, above the preset threshold is used in actions 301, 302.

Figure 9:
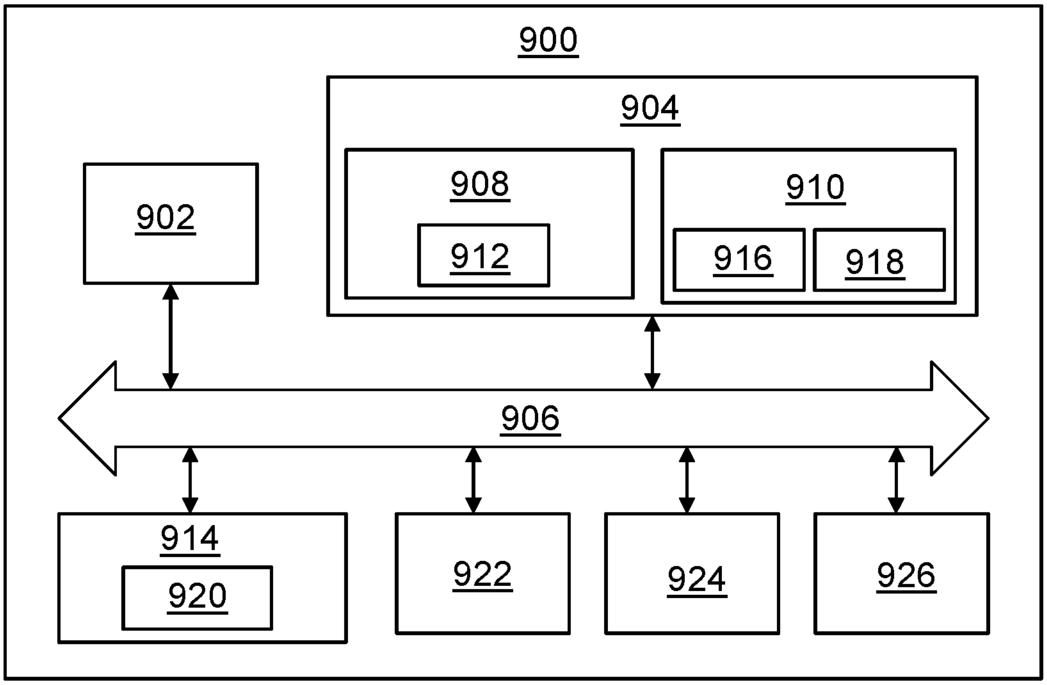
FIG. 9 is a schematic diagram of an exemplary computer system for implementing examples disclosed herein, according to one example.

FIG. 9 is a schematic diagram of the computer system 900 for implementing examples disclosed herein. The computer system 900 is adapted to execute instructions from a computer-readable medium to perform these and/or any of the functions or processing described herein. The computer system 900 may be connected (e.g., networked) to other machines in a LAN, an intranet, an extranet, or the Internet. While only a single device is illustrated, the computer system 900 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 900 may comprise at least one computing device or electronic device capable of including firmware, hardware, and/or executing software instructions to implement the functionality described herein. The computer system 900 may include the processor device 902 (may also be referred to as a control unit), a memory 904, and a system bus 906. The computer system 900 may include at least one computing device having the processor device 902. The system bus 906 provides an interface for system components including, but not limited to, the memory 904 and the processor device 902. The processor device 902 may include any number of hardware components for conducting data or signal processing or for executing computer code stored in memory 904. The processor device 902 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 906 may be any of several types of bus structures that may further interconnect to a memory bus (with or without a memory controller), a peripheral bus, and/or a local bus using any of a variety of bus architectures. The memory 904 may be one or more devices for storing data and/or computer code for completing or facilitating methods described herein. The memory 904 may include database components, object code components, script components, or other types of information structure for supporting the various activities herein. Any distributed or local memory device may be utilized with the systems and methods of this description. The memory 904 may be communicably connected to the processor device 902 (e.g., via a circuit or any other wired, wireless, or network connection) and may include computer code for executing one or more processes described herein. The memory 904 may include non-volatile memory 908 (e.g., read-only memory (ROM), erasable programmable read-only memory (EPROM), electrically erasable programmable read-only memory (EEPROM), etc.), and volatile memory 910 (e.g., random-access memory (RAM)), or any other medium which can be used to carry or store desired program code in the form of machine-executable instructions or data structures and which can be accessed by a computer or other machine with a processor device 902. A basic input/output system (BIOS) 912 may be stored in the non-volatile memory 908 and can include the basic routines that help to transfer information between elements within the computer system 900.

The computer system 900 may further include or be coupled to a non-transitory computer-readable storage medium such as the storage device 914, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 914 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 914 and/or in the volatile memory 910, which may include an operating system 916 and/or one or more program modules 918. All or a portion of the examples disclosed herein may be implemented as a computer program product 920 stored on a transitory or non-transitory computer-usable or computer-readable storage medium (e.g., single medium or multiple media), such as the storage device 914, which includes complex programming instructions (e.g., complex computer-readable program code) to cause the processor device 902 to carry out the steps described herein. Thus, the computer-readable program code can comprise software instructions for implementing the functionality of the examples described herein when executed by the processor device 902. The processor device 902 may serve as a controller or control system for the computer system 900 that is to implement the functionality described herein.

The computer system 900 also may include an input device interface 922 (e.g., input device interface and/or output device interface). The input device interface 922 may be configured to receive input and selections to be communicated to the computer system 900 when executing instructions, such as from a keyboard, mouse, touch-sensitive surface, etc. Such input devices may be connected to the processor device 902 through the input device interface 922 coupled to the system bus 906 but can be connected through other interfaces such as a parallel port, an Institute of Electrical and Electronic Engineers (IEEE) 1394 serial port, a Universal Serial Bus (USB) port, an IR interface, and the like. The computer system 900 may include an output device interface 924 configured to forward output, such as to a display, a video display unit (e.g., a liquid crystal display (LCD) or a cathode ray tube (CRT)). The computer system 900 may also include a communications interface 926 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms “a,” “an,” and “the” are intended to include the plural forms as well, unless the context clearly indicates otherwise. As used herein, the term “and/or” includes any and all combinations of one or more of the associated listed items. It will be further understood that the terms “comprises,” “comprising,” “includes,” and/or “including” when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as “below” or “above” or “upper” or “lower” or “horizontal” or “vertical” may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A computer system comprising a processor device configured to determine lateral offsets to a predefined path for a set of vehicles, the set of vehicles being arranged to travel on the predefined path, the processor device is further configured to:

for each vehicle in the set of vehicles, obtain an indication of a load exerted on a ground surface of the respective vehicle, determine the lateral offsets for the set of vehicles, wherein each lateral offset of the lateral offsets is determined for a respective vehicle in the set of vehicles based at least in part on indication of the load exerted on the ground surface of the respective vehicle, wherein each lateral offset is determined for a respective vehicle in the set of vehicles, and wherein the lateral offsets are determined to laterally distribute the loads of the set of vehicles relative to the predefined path, for each vehicle in the set of vehicles, trigger the respective vehicle to travel the predefined path using the determined respective lateral offset, obtain an indication that a load exerted on a ground surface by at least one vehicle in the set of vehicles has changed, and update the lateral offsets for the set of vehicles, based on the obtained indication that the load exerted on the load surface has changed.

2. A computer-implemented method for determining lateral offsets to a predefined path for a set of vehicles, the set of vehicles being arranged to travel on the predefined path, the method comprising:

by a processor device of a computer system, for each vehicle in the set of vehicles, obtaining an indication of a load exerted on a ground surface of the respective vehicle, by the processor device, determining the lateral offsets for the set of vehicles, wherein each lateral offset of the lateral offsets is determined for a respective vehicle in the set of vehicles based at least in part on indication of the load exerted on the ground surface of the respective vehicle, wherein each lateral offset is determined for a respective vehicle in the set of vehicles, and wherein the lateral offsets are determined to laterally distribute the loads of the set of vehicles relative to the predefined path, by the processor device, for each vehicle in the set of vehicles, triggering the respective vehicle to travel the predefined path using the determined respective lateral offset, obtain an indication that a load exerted on a ground surface by at least one vehicle in the set of vehicles has changed, and update the lateral offsets for the set of vehicles, based on the obtained indication that the load exerted on a load surface has changed.

3. The method of claim 2, wherein each determined lateral offset is a respective constant lateral offset to the predefined path.

4. The method of claim 2, wherein each determined lateral offset is a respective variable lateral offset to the predefined path.

5. The method of claim 4, wherein the respective variable lateral offset to the predefined path is configured to be variable based on a longitudinal position of the respective vehicle, when the respective vehicle is travelling the predefined path.

6. The method of claim 4, wherein the respective variable lateral offset to the predefined path is configured to be variable based on a variable width of the predefined path.

7. The method of claim 2, wherein the predefined path comprises a set of segments, and wherein determining the lateral offsets for the set of vehicles comprises determining a respective lateral offset for each respective segment for each respective vehicle, and wherein the lateral offsets for the set of segments are determined to laterally distribute the loads of the set of vehicles relative to the predefined path for each respective segment.

8. The method of claim 7, wherein the lateral offsets for at least one segment in the set of segments are determined such that the set of vehicles can travel the at least one segment in two different directions.

9. The method of claim 2, wherein the method further comprises:

by the processor device, obtaining an indication of a first position, the first position being a current or estimated future position of any one out of: an obstacle, manual actor, and a separate vehicle, in the predefined path, and wherein determining the lateral offset of the set of vehicles is based on the obtained first position.

10. The method of claim 2, wherein the method further comprises:

by the processor device, obtain an indication of a second position in the predefined path, the second position being a position wherein at least one vehicle in the set of vehicles has detected a poor traction in the predefined path, and wherein determining the lateral offsets of the set of vehicles is based on the obtained second position.

11. A vehicle comprising a processor device to perform the method of claim 2.

12. A control system comprising one or more control units configured to perform the method of claim 2.

13. A non-transitory computer-readable storage medium comprising instructions, which when executed by the processor device, cause the processor device to perform the method of claim 2.

* * * * *